United States Patent
Siqueira et al.

(10) Patent No.: US 10,427,623 B2
(45) Date of Patent: Oct. 1, 2019

(54) VEHICLE DOOR TRIM PANEL WITH STORAGE AND ENERGY ABSORPTION FUNCTIONALITY

(71) Applicant: GM GLOBAL TECHNOLOGY OPERATIONS LLC, Detroit, MI (US)

(72) Inventors: Fernando A. Siqueira, Sao Paulo (BR); Adelchi R. Tiboni, Sao Paulo (BR); Edson B. Cantarino, Sao Paulo (BR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 263 days.

(21) Appl. No.: 15/584,832

(22) Filed: May 2, 2017

(65) Prior Publication Data
US 2018/0319346 A1 Nov. 8, 2018

(51) Int. Cl.
*B60R 13/02* (2006.01)
*B60R 7/04* (2006.01)

(52) U.S. Cl.
CPC .......... *B60R 13/0243* (2013.01); *B60R 7/046* (2013.01)

(58) Field of Classification Search
CPC ............................ B60R 13/0243; B60R 7/046
See application file for complete search history.

(56) References Cited

U.S. PATENT DOCUMENTS

| | | | | |
|---|---|---|---|---|
| 3,449,881 A | * | 6/1969 | Wilfert | B60J 5/0455 296/146.5 |
| 5,073,318 A | * | 12/1991 | Rohrlach | B29C 44/1257 264/138 |
| 5,549,327 A | * | 8/1996 | Rusche | B60R 21/04 280/751 |
| 5,857,702 A | * | 1/1999 | Suga | B60J 5/0451 188/377 |
| 2009/0256391 A1 | * | 10/2009 | Hall | B60J 5/0451 296/187.12 |
| 2014/0138978 A1 | * | 5/2014 | Langenbacher | B60N 3/101 296/37.13 |
| 2015/0314808 A1 | * | 11/2015 | Jenkins | B62D 21/157 296/187.12 |
| 2016/0229348 A1 | * | 8/2016 | Farooq | B60R 7/046 |

(Continued)

FOREIGN PATENT DOCUMENTS

| | | | | |
|---|---|---|---|---|
| DE | 2510220 A1 | * | 9/1976 | ............. B60H 1/247 |
| DE | 102012220858 A1 | * | 5/2013 | ............. B60J 5/0451 |
| DE | 202018103598 U1 | * | 7/2018 | ............. B60N 3/102 |

*Primary Examiner* — Hilary L Gutman
(74) *Attorney, Agent, or Firm* — Lorenz & Kopf, LLP

(57) ABSTRACT

A vehicle door trim panel having a vehicle occupant-facing A-side and a vehicle door structure-facing B-side, and includes a first storage pocket partially open to the A-side and fully-closed to the B-side disposed along a first portion of a length of the vehicle door trim panel and a second storage pocket that is substantially fully closed to the A-side and fully closed to the B-side disposed adjacent to the first storage pocket along a second portion of the length of the vehicle door trim panel. The first portion of the length and the second portion of the length are adjacent to one another and do not overlap. The second storage pocket is open laterally to the first storage pocket. The second storage pocket includes a B-side interior portion and a B-side periphery portion. At least some of the B-side periphery portion has a tiered configuration.

17 Claims, 9 Drawing Sheets

(56) References Cited

U.S. PATENT DOCUMENTS

| | | | |
|---|---|---|---|
| 2018/0154744 A1* | 6/2018 | Hashiguchi | B60J 5/0413 |
| 2018/0222293 A1* | 8/2018 | Thomas | E05B 83/28 |
| 2018/0281690 A1* | 10/2018 | Gutierrez Guzman | B60R 7/046 |
| 2018/0304728 A1* | 10/2018 | Flores Diaz | B60J 5/0413 |

* cited by examiner

VEHICLE DOOR TRIM PANEL WITH STORAGE AND ENERGY ABSORPTION FUNCTIONALITY

INTRODUCTION

The present disclosure generally relates to door trim panels for use in vehicles, such as automobiles. More particularly, the present disclosure relates to vehicle door trim panels that are designed so as to incorporate both object storage and impact energy absorption functionalities.

Vehicles have been provided with various structural upgrades to lessen the effects of impact on an occupant compartment of the vehicle. Particularly, to lessen the effects of impact of the vehicle occupant seating area, a number of approaches have been undertaken, which include providing a collapsible/deformable barrier within the door trim panel to absorb the impact energy of the event, protecting the occupant.

In addition to its role in protecting the vehicle occupants, the door trim panel may also provide an object storage functionality. For example, vehicle doors commonly include a storage pocket. The storage pocket may be used by an occupant for the convenient storage of maps and other small items. Objects are introduced into the storage pocket through an open end. The size, shape, configuration, and features of the storage pocket are highly variable, and are primarily dependent on the particular functional, design, and aesthetic considerations for the vehicle for which the storage pocket is designed.

Accordingly, it would be desirable to provide a vehicle door trim panel with increased collision impact energy absorption capability while simultaneously providing increased object storage capacity. Furthermore, other desirable features and characteristics of the present disclosure will become apparent from the subsequent detailed description and the appended claims, taken in conjunction with the accompanying drawings and this introductory section.

BRIEF SUMMARY

In one embodiment, disclosed is a vehicle door trim panel having a vehicle occupant-facing A-side and a vehicle door structure-facing B-side, and includes a first storage pocket partially open to the A-side and fully-closed to the B-side disposed along a first portion of a length of the vehicle door trim panel and a second storage pocket that is substantially fully closed to the A-side and fully closed to the B-side disposed adjacent to the first storage pocket along a second portion of the length of the vehicle door trim panel. The first portion of the length and the second portion of the length are adjacent to one another and do not overlap. The second storage pocket is open laterally to the first storage pocket. The second storage pocket includes a B-side interior portion and a B-side periphery portion. At least some of the B-side periphery portion has a tiered configuration or a multi-tiered configuration.

In another embodiment, disclosed is a vehicle that includes an occupant compartment and at least one door providing access to the occupant compartment. The door includes a door trim panel that has a vehicle occupant-facing A-side and a vehicle door structure-facing B-side. The vehicle door trim panel includes a first storage pocket partially open to the A-side and fully-closed to the B-side disposed along a first portion of a length of the vehicle door trim panel and a second storage pocket that is substantially fully closed to the A-side and fully closed to the B-side disposed adjacent to the first storage pocket along a second portion of the length of the vehicle door trim panel. The first portion of the length and the second portion of the length are adjacent to one another and do not overlap. The second storage pocket is open laterally to the first storage pocket. The second storage pocket includes a B-side interior portion and a B-side periphery portion. At least some of the B-side periphery portion has a tiered configuration or a multi-tiered configuration.

In yet another embodiment, disclosed is a method for manufacturing a vehicle door trim panel includes the steps of providing an A-side of the vehicle door trim panel, the A-side including a plurality of cut outs, and providing a B-side of a first storage pocket and adjoining the B-side of the first storage pocket to the A-side at one of the plurality of cut outs such that the first storage pocket is partially open to the A-side and fully-closed to the B-side and is disposed along a first portion of a length of the vehicle door trim panel. The method further includes the step of providing a B-side of a second storage pocket and adjoin the B-side of the second storage pocket to the A-side such that the second storage pocket is substantially fully closed to the A-side and fully closed to the B-side and is disposed adjacent to the first storage pocket along a second portion of the length of the vehicle door trim panel. The first portion of the length and the second portion of the length are adjacent to one another and do not overlap. The second storage pocket is open laterally to the first storage pocket, and wherein the B-side of the second storage pocket includes a B-side interior portion and a B-side periphery portion. At least some of the B-side periphery portion has a tiered configuration or a multi-tiered configuration.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses of the disclosed vehicle door trim panels. Furthermore, there is no intention to be bound by any theory presented in the preceding introductory section or the following detailed description.

Disclosed herein are vehicle door trim panels, and methods of manufacturing the same, wherein the impact absorption zone further provides an object storage functionality. In this manner, the portion of the door trim panel configured to provide object storage and the portion of the vehicle trim panel configured to provide impact energy absorption are not mutually exclusive. In order to achieve this dual functionality, a storage pocket is disclosed herein that includes a multi-tiered periphery that is designed to collapse and absorb energy in the event of an impact.

Figure 1A:
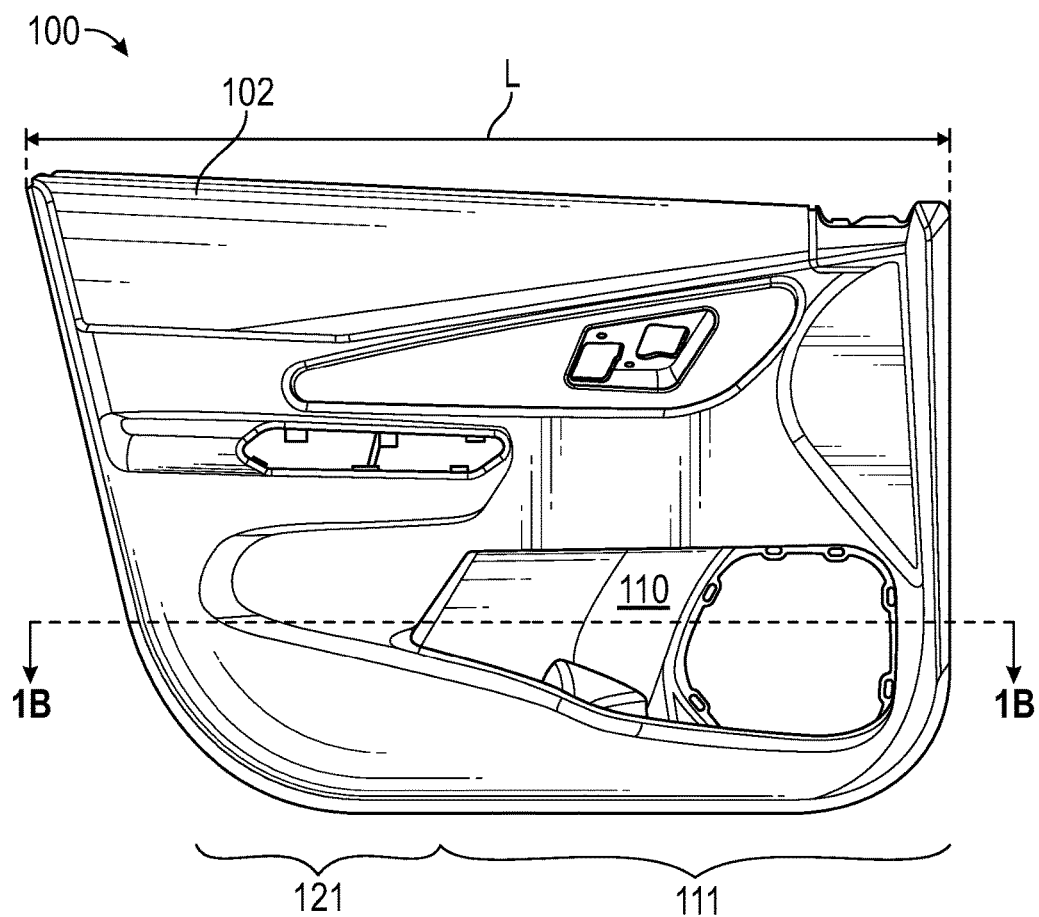
FIG. 1A illustrates the A-side of a door trim panel.
Figure 1B:
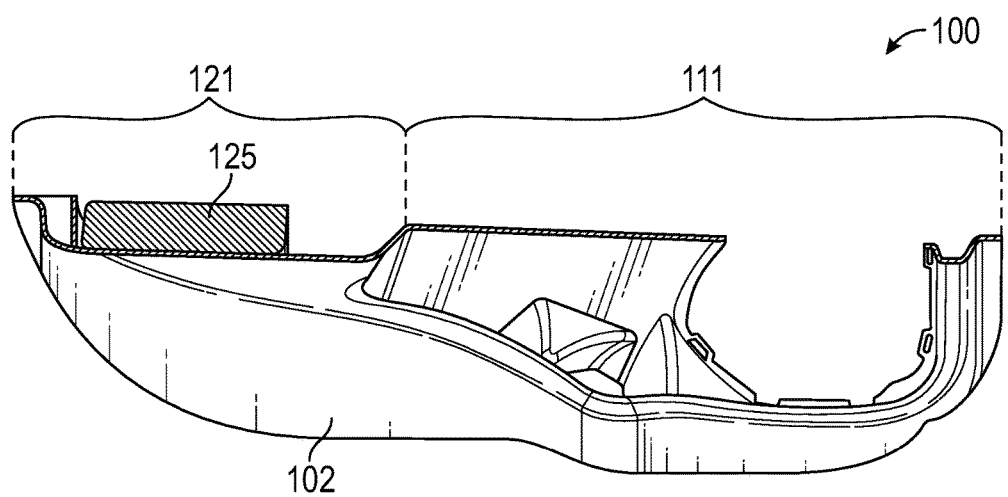
FIG. 1B is a cross-section through the door trim panel of FIG. 1A, taken along line B-B.
Figure 2:
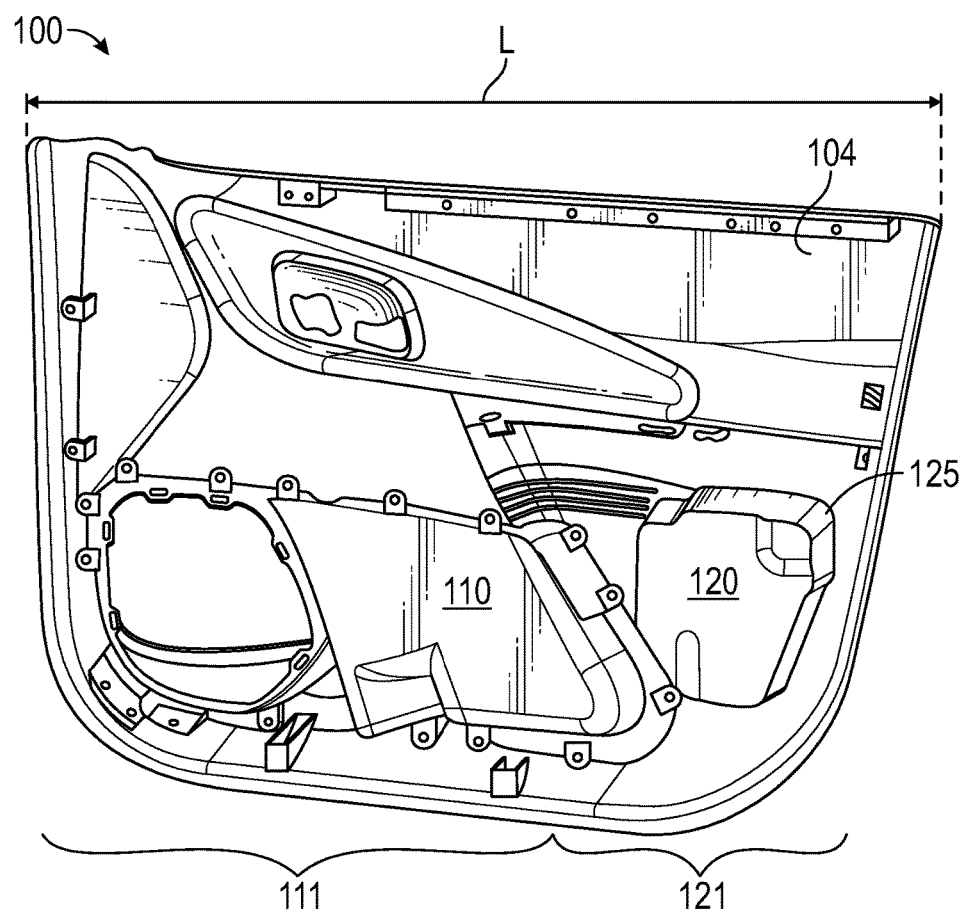
FIG. 2 illustrates the B-side of the door trim panel of FIG. 1A.
Figure 3A:
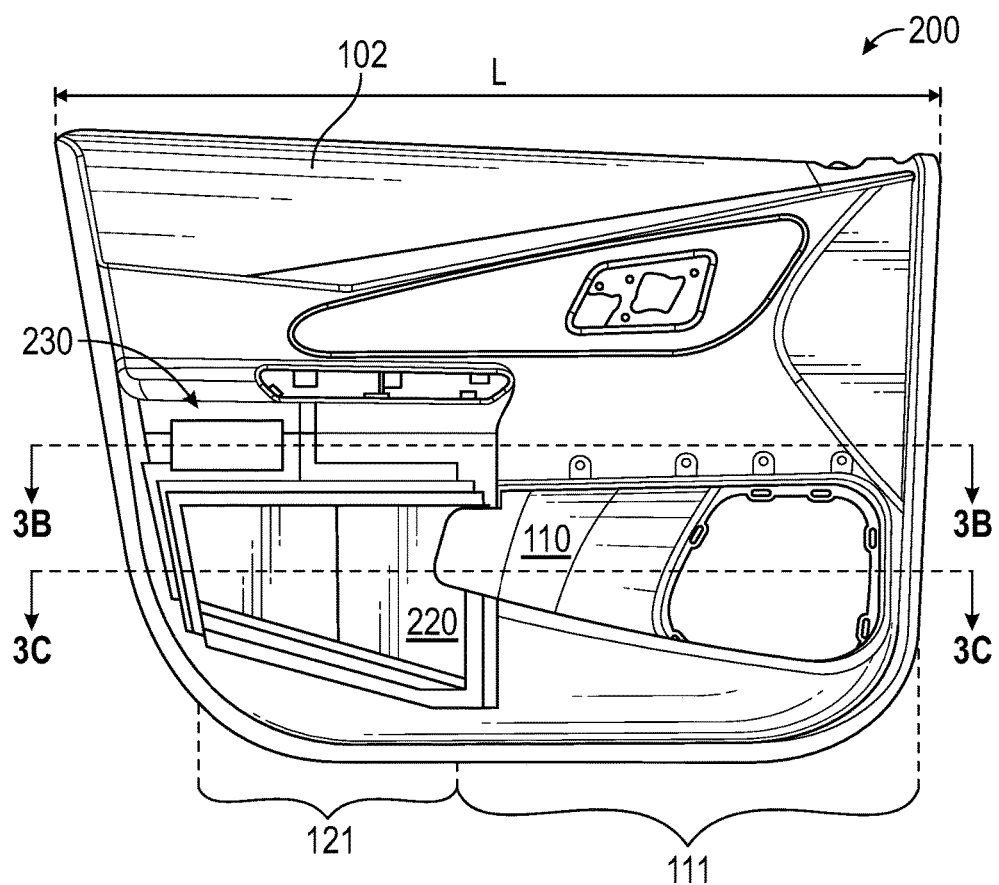
FIG. 3A illustrates the A-side of a door trim panel in accordance with the present disclosure.
Figure 3B:
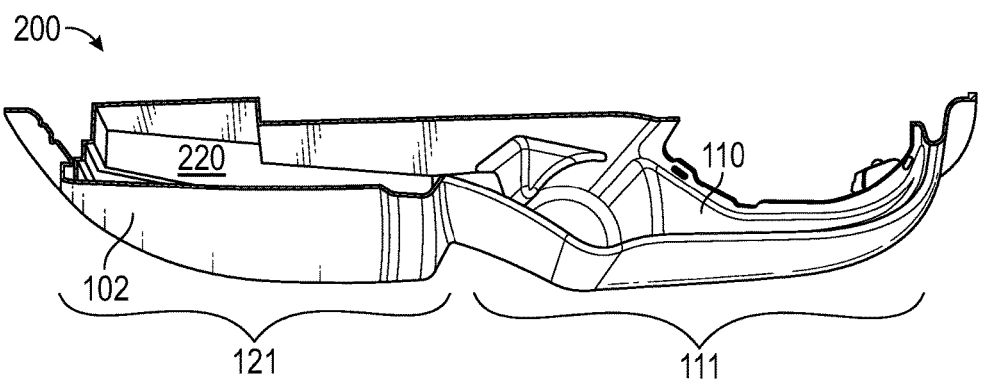
FIG. 3B is a cross-section through the door trim panel of FIG. 3A, taken along line B-B.
Figure 3C:
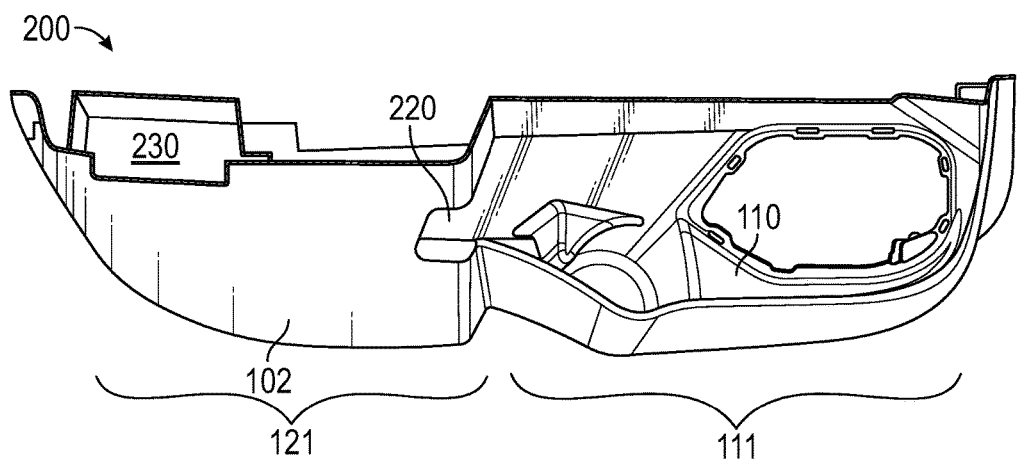
FIG. 3C is a cross-section through the door trim panel of FIG. 3A, taken along line C-C.
Figure 4:
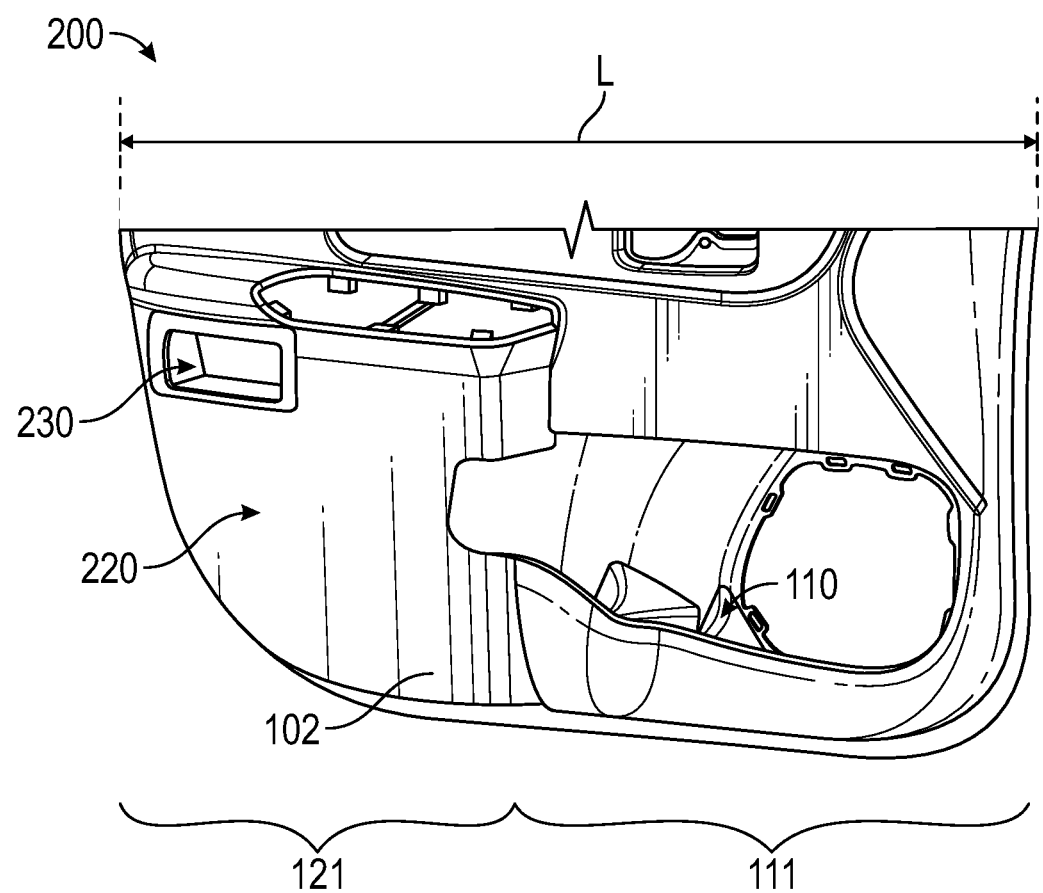
FIG. 4 is a further illustration of the A-side of the door trim panel of FIG. 3A.

FIGS. 1A, 1B, and 2 illustrate a door trim panel 100, which includes features for both collision impact absorption and object storage. As illustrated, door trim panel 100 includes an "A-side" 102, that is, the side of the trim panel facing the vehicle occupants, and a "B-side" 104, opposite the A-side 102, which abuts the door structure. Door trim panel 100 is characterized by a length "L", which is the lengthwise dimension of the door trim panel 100 along the side of the vehicle. The object storage functionality of the door trim panel 100, which is provided as storage pocket 110, occupies a first portion of the length L, namely portion 111. The remainder of length L, namely portion 121, provides a collision impact absorption zone 120. Zone 120 includes an energy absorber 125, which is typically a crushable or collapsible insert that is design to minimize the transfer of energy to the vehicle occupant.

Thus, it becomes clear from FIGS. 1A, 1B, and 2, in the shown configuration, there is a tradeoff, with respect to the design of the door trim panel 100, when considering the area available for the impact absorption zone 120 and the area available for the storage pocket 110. In this configuration, increasing portion 111, to provide more storage, necessarily decreases portion 121, which leaves a smaller area for the impact absorption zone 120, which may lead to less desirable collision performance. Conversely, increasing the size of 120 necessarily limits the area available for portion 111, thus undesirably providing the vehicle occupant with less storage space.

FIGS. 3A-C, 4, and 5A-B illustrate an exemplary vehicle door trim panel 200 in accordance with an embodiment of the present disclosure. Vehicle door trim panel 200 includes an A-side 102 (best seen in FIGS. 3A-C and 4) and a B-side (best seen in FIGS. 5A-B). Door trim panel 200 is characterized by length L, which spans lengthwise along a vehicle door. References to portions of length L in this disclosure should be understood as encompassing an area of the door trim panel that is delineated by such portions of length L. The material from which door trim panel 100 is made may vary from embodiment to embodiment, and is primarily an aesthetic consideration, particularly the A-side 102. For example, interior trim components are often given treatments that provide increases in perceived value as well as brand differentiation. The current automotive interior styling trend is toward a softer, wrap-around styling vision which places special emphasis on the tactile feel of the interior, as well as the visual impression. Typical materials for the A-side 102 are flocking, leather, vinyl or textile materials, including cloth or carpet. Trim panel 200 may include various ergonomic features such as arm-rests and the like. Trim panel 200 may include various cut-outs for the placement of various functional features of the vehicle, such as the door hand, window controls, lock controls, audio speakers, and the like.

Door trim panel 200 includes a first storage pocket 110, which is designed primarily for object storage purposes. The particular configuration of first storage pocket 110 may vary from embodiment to embodiment, and is not a critical aspect of the disclosure. For example, in some embodiments, first storage pocket 110 may include a cup-holder feature, a map pocket feature, an umbrella storage feature, or any combination thereof. Given the need to secure objects, first storage pocket 110 is preferably made from a relatively rigid material, such as a molded thermoplastic material.

With regard to length L, the first storage pocket 110 is provided in portion 111. Portion 111 may generally occupy from about 20% to about 80% of length L, such as about 30% to about 70%, or about 40% to about 60%. First storage pocket 110 is partially open at the A-side 102, while fully closed at the B-side 104; in this manner, the vehicle occupant is able to place an object within first storage pocket 110 through the partially-open A-side 102, and have that object securely retained therein for later retrieval. As shown, the open portion of the A-side 102 is the upper portion of the first storage pocket 110, while the closed portion of the A-side 102 is the lower portion of the first storage pocket 110; in this manner, the occupant places objects therein in an a descending fashion.

Vehicle door trim panel 200 further includes a second storage pocket 220, which is designed for both object storage and collision impact energy absorption purposes. As shown, with regard to the A-side 102, second storage pocket 220 is almost completely covered by the A-side material, and thus is provided in the form of a "cavity" behind the A-side material. As used herein, "almost completely covered" means that the A-side material covers a substantial majority of the portion of the door trim panel 200 occupied by second storage pocket, namely portion 121, such as greater than about 80%, greater than about 85%, or greater than about 90%. Stated alternatively, the second storage pocket 220 is substantially fully-closed at the A-side 102. The second storage pocket 220 is fully closed at the B-side 104.

Access to the second storage pocket 220 for placing objects therein is achieved, therefore, by initially placing the objects through the open upper portion of the first storage pocket 110, and then moving the objects laterally (lengthwise) in to the cavity of second storage pocket 220. In this manner, it should be appreciated that second storage pocket 220 is open laterally to the first storage pocket 110. Objects are thus securely retained in the second storage pocket 220 between the A-side 102 and the B-side 104. Second storage pocket 220 may be separated, at least partially, from first storage pocket 110, by an appropriate dividing feature in the lower portion thereof. Like storage pocket 110, the intended use of storage pocket 220, with regard to its object storage functionality, is not a critical aspect of this disclosure. It could serve as a map pocket, umbrella pocket, or generally purpose storage area, for example.

Figure 5A:
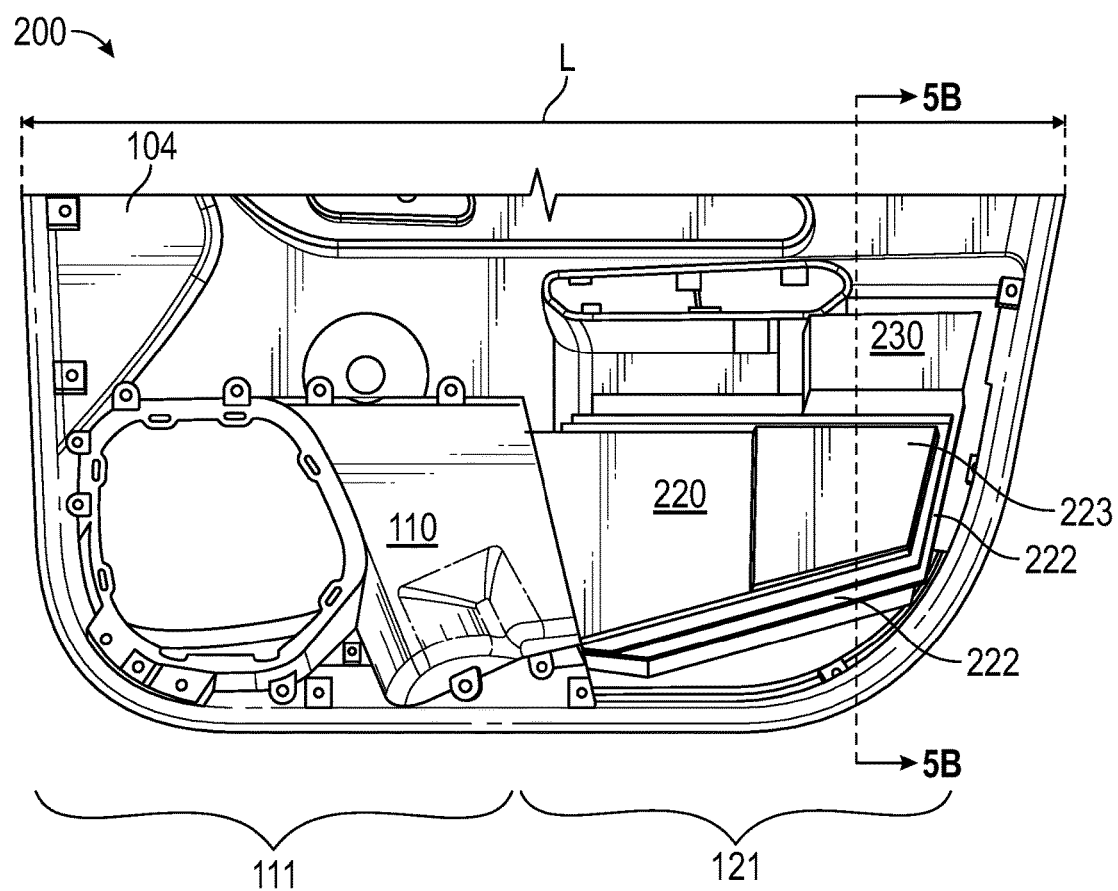
FIG. 5A illustrates the B-side of the door trim panel of FIG. 3A.
Figure 5B:
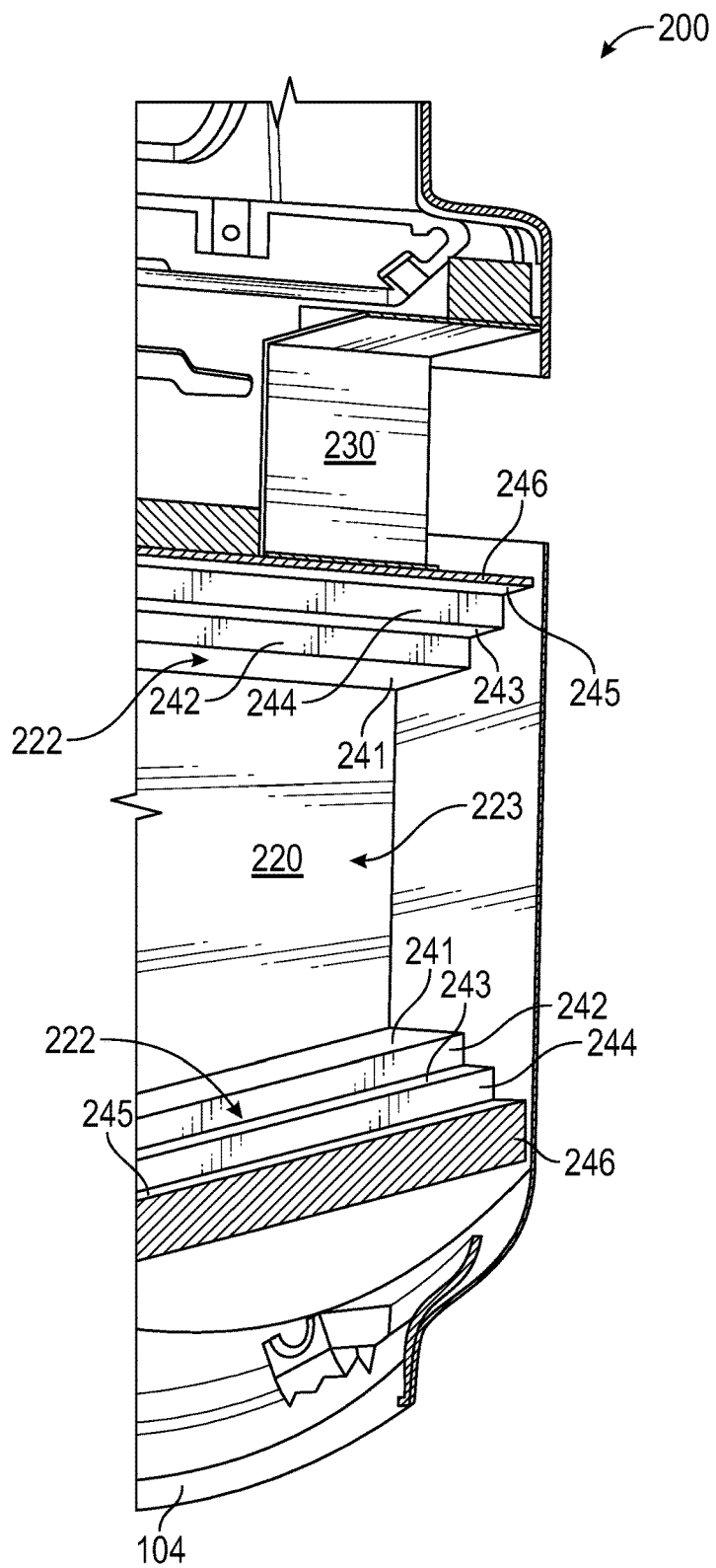
FIG. 5B is a cross-section through the door trim panel illustrated in FIG. 5A, taken along line B-B.

Turning now to the collision impact energy absorption functionality of the second storage pocket 220, attention is directed in particular to FIGS. 5A and 5B, which best illustrates the B-side 104. As shown, the second storage pocket 220 has a periphery 222. The periphery 222 is that portion of the second storage pocket 220 that defines it outer bounds. The periphery 222 may be configured in a multi-tiered fashion such that it is designed to collapse and absorb energy in the event of an impact. In some embodiments, at least a majority of the length of the periphery is configured in the multi-tiered fashion. For example, greater than about 60%, greater than about 70%, or greater than about 80% of the periphery, with regard to its length, may be configured in the multi-tiered fashion. As illustrated, the periphery 222 of second storage pocket 220 is provided entirely in the multi-tiered configuration, except where the second storage pocket 220 abuts the first storage pocket 110.

Greater detail will now be provided regarding the multi-tiered configuration of the periphery 222 of the second storage pocket 220. As best shown in FIG. 5B, the B-side 104 of the second storage pocket includes an interior portion 223 that abuts the door structure. The interior portion 223 is surrounded by the periphery 222. From its connection with the interior portion 223, the periphery first extends for a distance substantially toward the A-side 102, with what is referred to herein as a first perpendicular extension 241. (While the descriptor "perpendicular" is used herein, this does not necessarily imply an exact 90 degree angle between the interior portion and the extension 241. Rather, such angle may vary by up to about 10 degrees, about 20 degrees, about 30 degrees, or more. The basic idea is that the extension 241 progresses closer to the A-side 102 as compared with the interior portion 223.)

From the first perpendicular extension 241, away from the interior portion 223, is provided a first shelf portion 242, which is aligned substantially coplanar with regard to the interior portion 223. ("Substantially coplanar" could include a variance of up to about 10 degrees, about 20 degrees, about 30 degrees, or more. The basic idea is that the first shelf portion 242 progresses less toward the A-side 102 as compared with the first perpendicular extension 241.) From the first shelf portion 242, away from the interior portion 223, is provided a second perpendicular extension 243, then a second shelf portion 244, which are provided within the same descriptive constraints as set forth above with regard to the respective first extension 241/first shelf 242.

The periphery 222 may continue away from the interior portion 223 with further alternative perpendicular extensions/shelf portions (for example, also depicted in FIG. 5B are a third perpendicular extension 245 and a third shelf portion 246. The ultimate shelf portion in the sequence, e.g., third shelf portion 246, connects with the A-side 102. Any number, such as one, two, three, four, five, or more perpendicular extension/shelf portion pairs (i.e., "tiers") may be provided in an embodiment. Moreover, the respective widths of each perpendicular extension/shelf portion from one to another. In this manner, the periphery 222 is provided in a tiered (or multi-tiered) configuration as it extends from the interior portion 223 to the A-side 102, thereby forming the cavity of the second storage pocket 220. The tiered configuration allows the second storage pocket 220 to absorb collusion impact energy. Thus, a separate energy absorber (e.g., 125) need not be provided (and is not provided as illustrated) in portion 121 of door trim panel 220, allowing this portion to be used for additional object storage.

The material used for the B-side of the second storage pocket 220, namely for the interior portion 223 and the periphery 222, is preferably a material that is capable of crushing or deforming, as described above, to absorb collision impact energy. Thus, a thermoformable plastic material may be employed for this purpose. In these embodiments, the selection of the plastic material, particularly with regard to its material properties, may play a role in "tuning" the energy absorption characteristics of the second storage pocket. Of course, the design and configuration of the tiered periphery will also have an effect on this tuning.

In some embodiments, a third storage pocket 230 may be provided above the second storage pocket 220. Third storage pocket 230 is designed primarily for object storage purposes. The particular configuration of third storage pocket 230 may vary from embodiment to embodiment, and is not a critical aspect of the disclosure. Typically, the third storage pocket 230 is smaller (in total volume) than either of the first or second storage pockets 110, 220. The third storage pocket 230 may be accessible from an opening at the A-side 102. The third storage pocket 230 may have a lower surface that serves to support objects and separate it from the second storage pocket 220.

As noted above, the door trim panel 200 may be provided for use in a vehicle, such as an automobile. As will be appreciated, the trim panel 200 is affixed to the door structure using various means such as stakes and adhesives. The door structure may be one of a plurality of doors structures of the vehicle. The vehicle itself should be understood as containing all of the usual features, such as an interior compartment for the occupants, a propulsion means, a steering means, etc.

Figure 6:
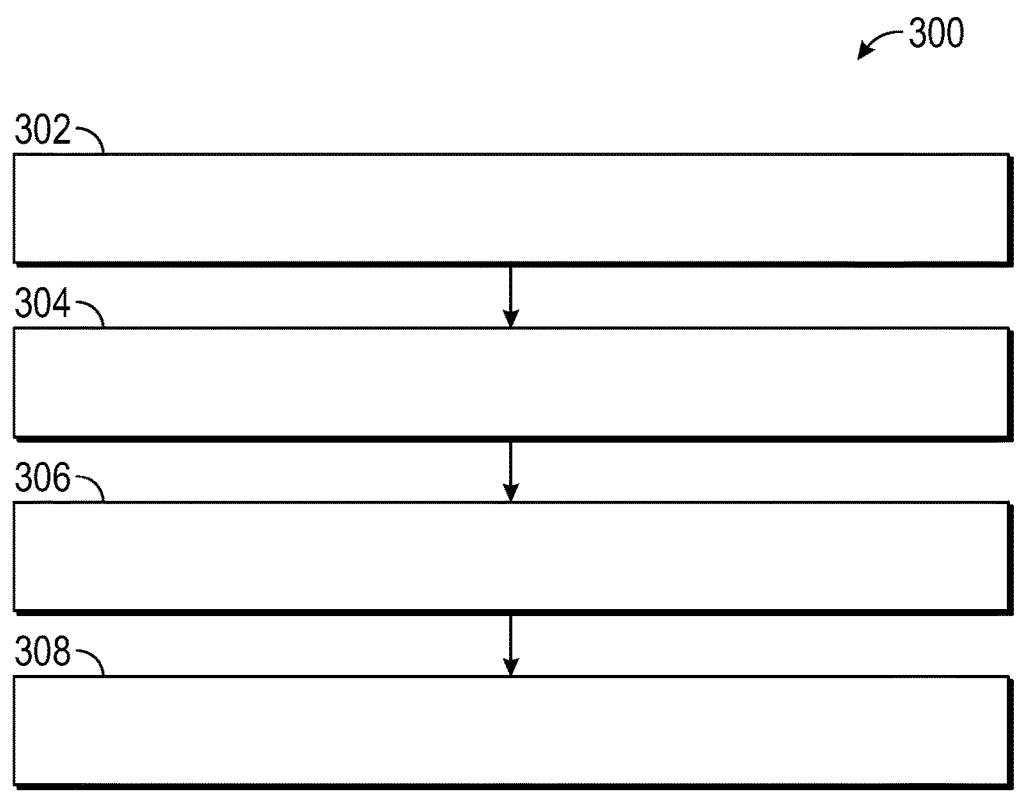
FIG. 6 is a method flowchart for manufacturing a door trim panel in accordance with the present disclosure.

Referring now to FIG. 6, a method 300 for manufacturing a door trim panel in accordance with the present disclosure is provided. The method 300 begins with a first step 302 of providing an A-side door trim component. The A-side door trim component typically includes a variety of cut-outs for the placement of function features of the vehicle, as well as to gain access to the various storage pockets. The method 300 continues with a second step 304 of providing a B-side of a first storage pocket and attaching the B-side of the first storage pocket to the A-side. The first storage pocket is provided primarily for storage purposes, and may be configured as any or all of a map pocket, cup-holder, umbrella storage, etc. The method 300 continues with a third step 306 of providing a B-side of a second storage pocket and attaching the B-side of the second storage pocket to the A-side. The second storage pocket is provided both for storage and collision impact energy absorption purposes, and as such may be provided with a multi-tiered periphery, as described above. Finally, the method concludes with a step 308 of affixing the door trim panel to a vehicle door structure. The method 300 may include more steps than those recited above, and thus steps 302-308 should not be viewed as exclusive of other steps. Moreover, the steps of method 300 may be performed in an order different than presented above.

Accordingly, the present disclosure has provided embodiments of vehicle door trim panels, and methods of manufacturing the same, wherein the collision impact absorption zone further provides an object storage functionality. In this manner, the portion of the door trim panel configured to provide object storage and the portion of the vehicle trim panel configured to provide impact energy absorption are not mutually exclusive. In order to achieve this dual functionality, this disclosure has provided a storage pocket that includes a multi-tiered periphery that is designed to collapse and absorb energy in the event of an impact. Accordingly, the present disclosure desirably provide a vehicle door trim panel with increased collision impact energy absorption capability while simultaneously providing increased object storage capacity.

While at least one exemplary vehicle door trim panel has been presented in the foregoing detailed description, it should be appreciated that a vast number of variations exist. It should also be appreciated that the exemplary vehicle door trim panel or exemplary vehicle door trim panels are only examples, and are not intended to limit the scope, applicability, or configuration of the disclosure in any way. Rather, the foregoing detailed description will provide those skilled in the art with a convenient road map for implementing an exemplary vehicle door trim panel of the disclosure. It is understood that various changes may be made in the function and arrangement of elements described in an exemplary vehicle door trim panel without departing from the scope of the disclosure as set forth in the appended claims.

What is claimed is:

1. A vehicle door trim panel having a vehicle occupant-facing A-side and a vehicle door structure-facing B-side, the vehicle door trim panel comprising:
   a first storage pocket partially open to the A-side and fully-closed to the B-side disposed along a first portion of a length of the vehicle door trim panel; and
   a second storage pocket that is substantially fully closed to the A-side and fully closed to the B-side disposed adjacent to the first storage pocket along a second portion of the length of the vehicle door trim panel, wherein the first portion of the length and the second portion of the length are adjacent to one another and do not overlap, wherein the second storage pocket is open laterally to the first storage pocket, and wherein the second storage pocket comprises a B-side interior portion and a B-side periphery portion,
   wherein at least some of the B-side periphery portion has a tiered configuration, wherein the tiered configuration of the B-side periphery portion comprises:
      (a) a first perpendicular extension adjacent and connected to the B-side interior portion that extends toward the A-side;
      (b) a first shelf portion adjacent and connected to the first perpendicular extension, wherein the first shelf portion does not extend toward the A-side or extends toward the A-side to a lesser extent as compared to the first perpendicular extension; and
      (c) a second perpendicular extension adjacent and connected to the first shelf portion that extends toward the A-side,
      wherein the B-side periphery portion comprises a first and a second lateral segment extending laterally within the second portion of the length, the first and the second lateral segments being separated vertically from one another and connected with one another by a vertical segment of the B-side periphery portion, wherein each of the first and second lateral segments and the vertical segment comprise the tiered configuration.

2. The vehicle door trim panel of claim 1, further comprising a third storage pocket open to the A-side and disposed above the second storage pocket.

3. The vehicle door trim panel of claim 2, wherein the third storage pocket is smaller in total volume as compared with either the first storage pocket of the second storage pocket.

4. The vehicle door trim panel of claim 1, wherein the vehicle door trim panel excludes a non-storage energy absorber insert in the second portion of the length of the vehicle door trim panel.

5. The vehicle door trim panel of claim 1, wherein a B-side of the first storage pocket comprises a thermoformed plastic material.

6. The vehicle door trim panel of claim 1, where the B-side interior portion and the B-side periphery portion of the second storage pocket comprises a thermoformed plastic material.

7. The vehicle door trim panel of claim 1, wherein the A-side of the vehicle door trim panel comprises a material that is one or more of flocking, leather, vinyl, and textile.

8. The vehicle door trim panel of claim 1, wherein the first storage pocket is configured with one or more of a cupholder feature, a map pocket feature, and an umbrella storage feature.

9. The vehicle door trim panel of claim 1, wherein the tiered configuration of the B-side periphery portion further comprises a second shelf portion adjacent and connected to the second perpendicular extension, wherein the second shelf portion does not extend toward the A-side or extends toward the A-side to a lesser extent as compared to the second perpendicular extension.

10. The vehicle door trim panel of claim 9, wherein the tiered configuration of the B-side periphery portion comprises a plurality of shelf portions, and wherein a shelf portion of the plurality of shelf portions that is furthest toward the A-side is physically joined with the A-side.

11. The vehicle door trim panel of claim 10, wherein a majority of a length of the B-side periphery is provided in the tiered configuration.

12. The vehicle door trim panel of claim 11, wherein an entirety of the length of the B-side periphery is provided in the tiered configuration, except where the second storage pocket abuts the first storage pocket.

13. The vehicle door trim panel of claim 12, further comprising a third storage pocket open to the A-side and disposed above the second storage pocket.

14. The vehicle door trim panel of claim 13, wherein the third storage pocket is smaller in total volume as compared with either the first storage pocket of the second storage pocket.

15. The vehicle door trim panel of claim 1, wherein a majority of a length of the B-side periphery is provided in the tiered configuration.

16. The vehicle door trim panel of claim 15, wherein an entirety of the length of the B-side periphery is provided in the tiered configuration, except where the second storage pocket abuts the first storage pocket.

17. A vehicle comprising:
   an occupant compartment; and
   at least one door providing access to the occupant compartment, wherein the door comprises a door trim panel that has a vehicle occupant-facing A-side and a vehicle door structure-facing B-side, wherein the vehicle door trim panel comprises:
      a first storage pocket partially open to the A-side and fully-closed to the B-side disposed along a first portion of a length of the vehicle door trim panel; and
      a second storage pocket that is substantially fully closed to the A-side and fully closed to the B-side disposed adjacent to the first storage pocket along a second portion of the length of the vehicle door trim panel, wherein the first portion of the length and the second portion of the length are adjacent to one another and do not overlap, wherein the second storage pocket is open laterally to the first storage pocket, and wherein the second storage pocket comprises a B-side interior portion and a B-side periphery portion,
      wherein at least some of the B-side periphery portion has a tiered configuration, wherein the tiered configuration of the B-side periphery portion comprises:
         (a) a first perpendicular extension adjacent and connected to the B-side interior portion that extends toward the A-side;
         (b) a first shelf portion adjacent and connected to the first perpendicular extension, wherein the first shelf portion does not extend toward the A-side or extends toward the A-side to a lesser extent as compared to the first perpendicular extension; and (c) a second perpendicular extension adjacent and connected to the first shelf portion that extends toward the A-side, wherein the B-side periphery portion comprises a first and a second lateral segment extending laterally within the second portion of the length, the first and the second lateral segments being separated vertically from one another and connected with one another by a vertical segment of the B-side periphery portion, wherein each of the first and second lateral segments and the vertical segment comprise the tiered configuration.

* * * * *